UNITED STATES PATENT OFFICE.

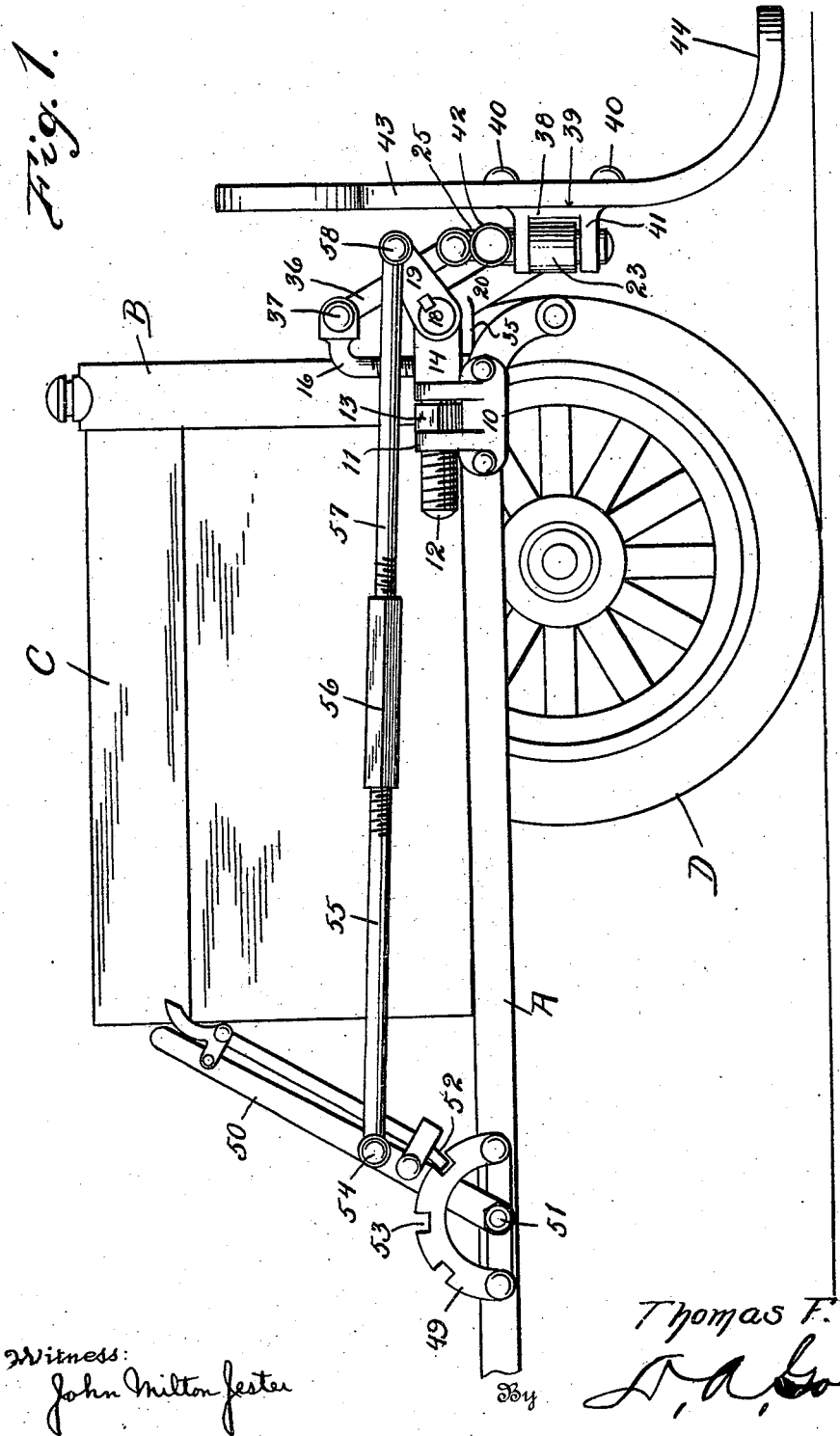

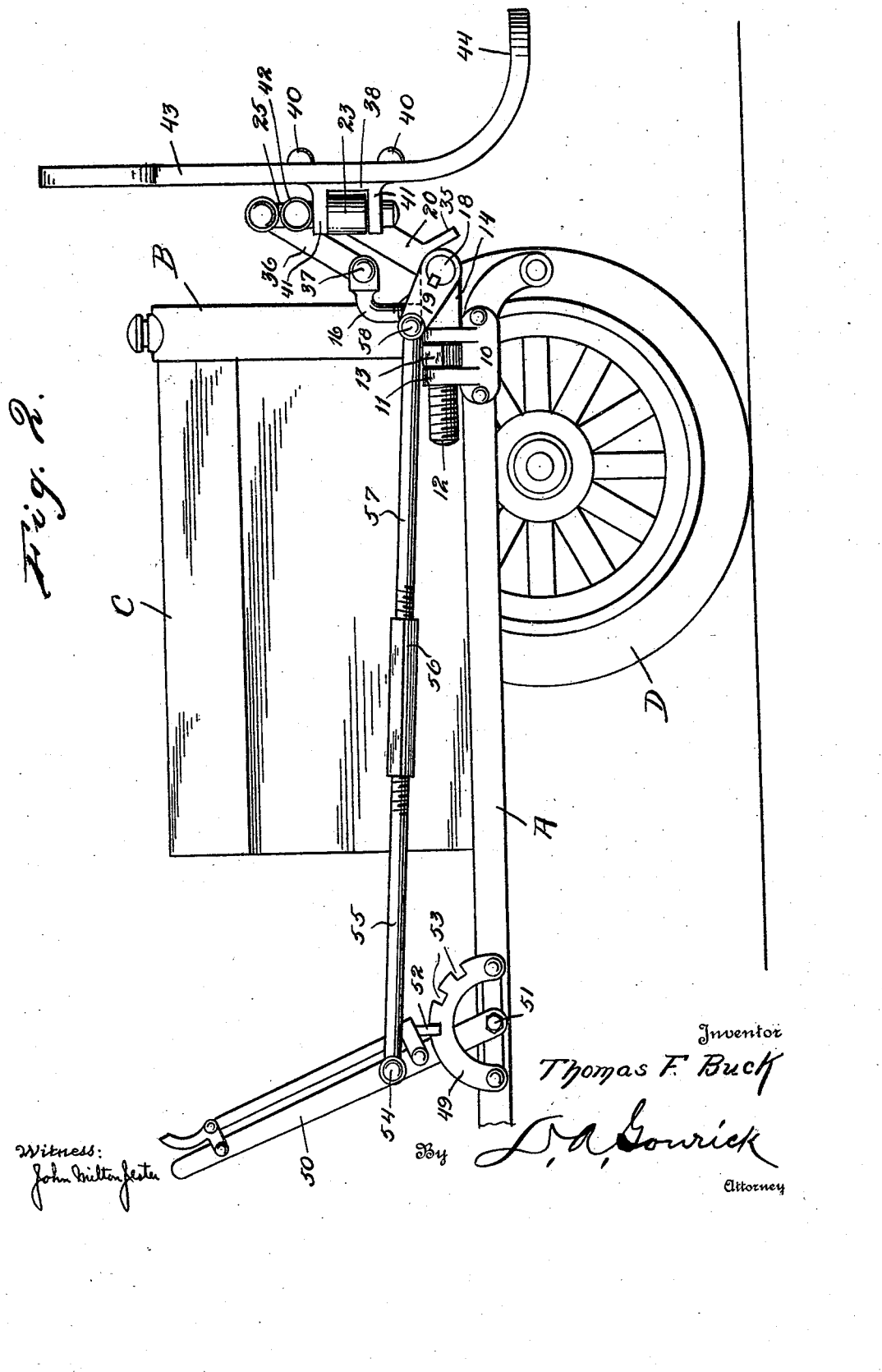

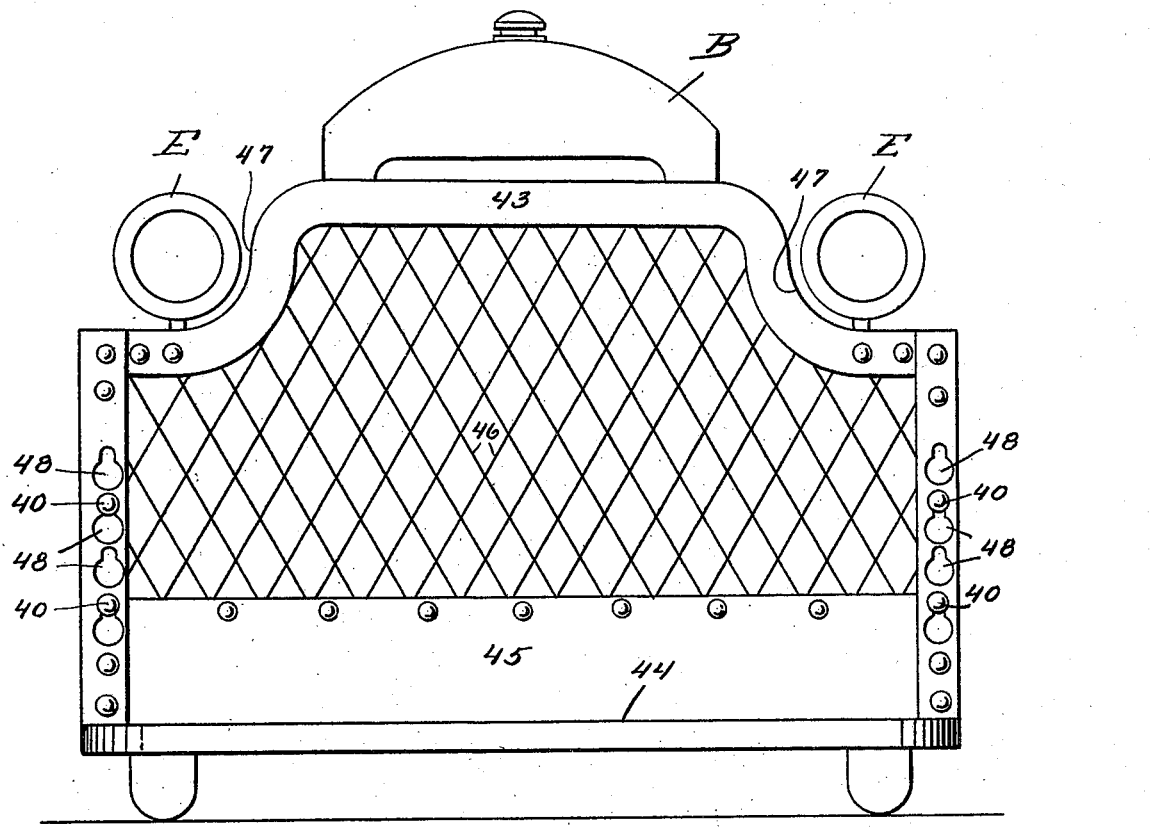
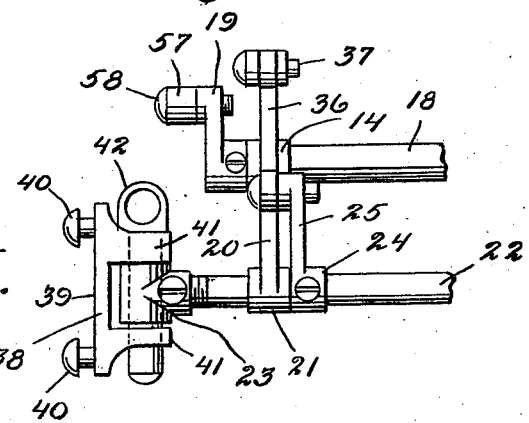

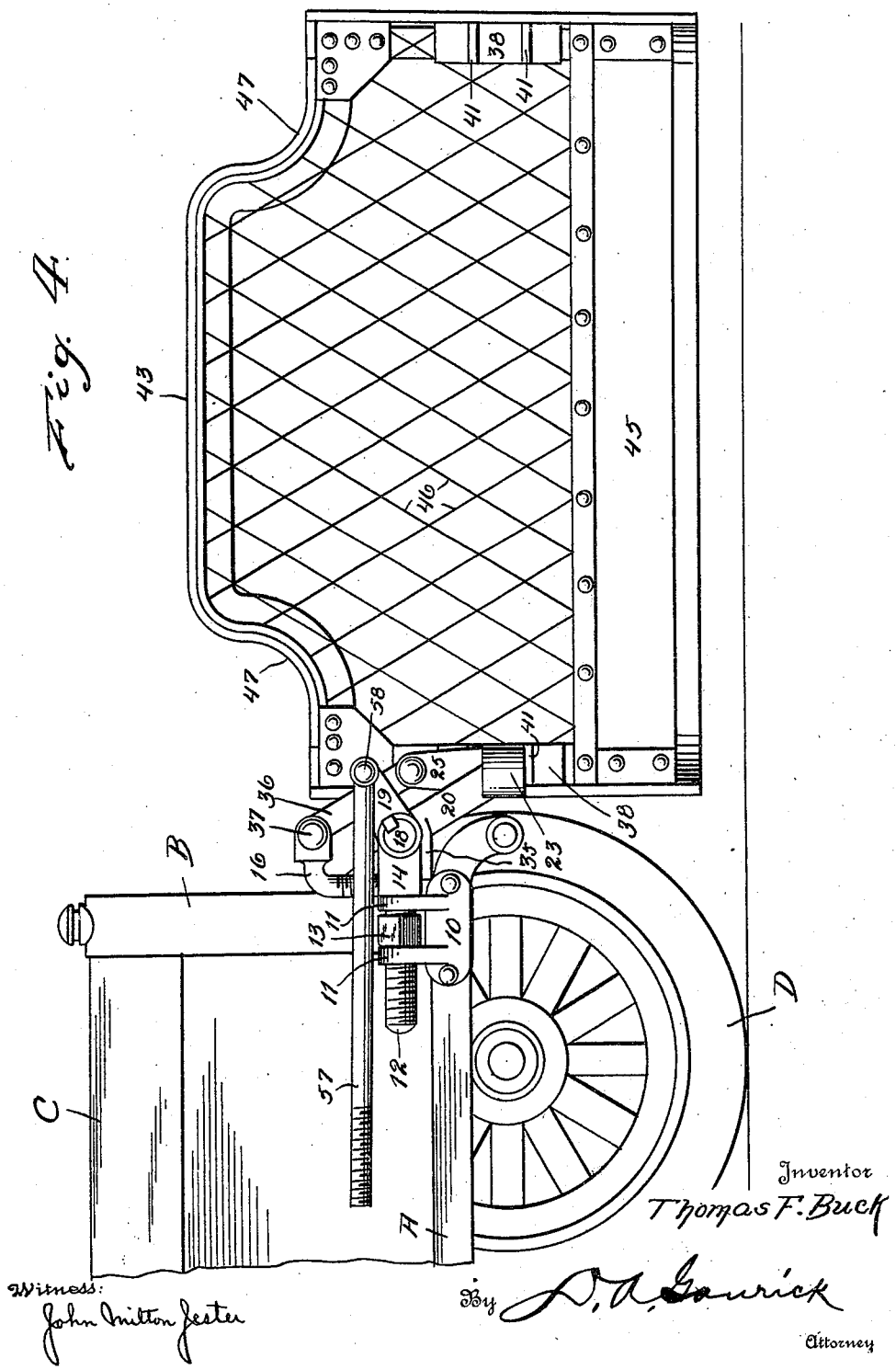

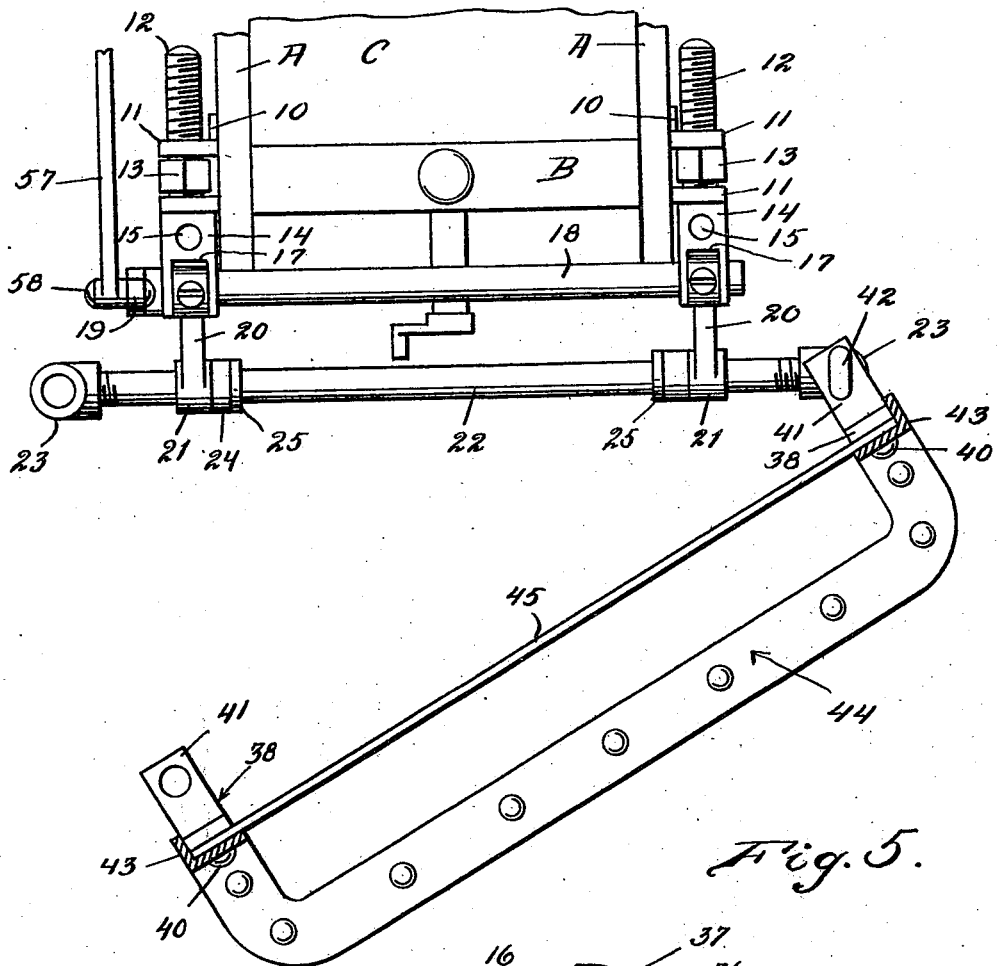
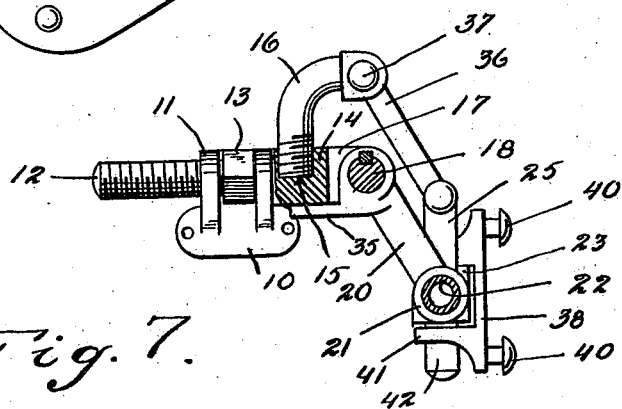

THOMAS F. BUCK, OF NEW CASTLE, PENNSYLVANIA.

SAFETY FENDER FOR AUTOMOBILES.

1,415,519.   Specification of Letters Patent.   Patented May 9, 1922.

Application filed January 6, 1922. Serial No. 527,439.

*To all whom it may concern:*

Be it known that I, THOMAS F. BUCK, a citizen of the United States, residing at New Castle, in the county of Lawrence and State of Pennsylvania, have invented certain new and useful Improvements in Safety Fenders for Automobiles, of which the following is a specification.

This invention relates to safety appliances, particularly to safety attachments for automobiles, and has for its object the provision of a novel bumper or fender adapted to be mounted upon the front of an automobile whereby to prevent running over pedestrians and to reduce the danger of injury to the car itself in the event of a minor collision.

An important object is the provision of a device of this character in which the fender proper may be raised out of its normal position in case the roads are sufficiently rough and full of obstructions that there might be danger of striking and breaking the fender, lever operated means within ready reach of the driver being provided for the purpose of effecting the raising of the fender.

Another important object is the provision of a device of this character in which the fender proper is so mounted that it may be quickly and easily disengaged entirely from its support in case such is desired, and that either side may be disconnected so that the fender proper may be swung to one side or the other out of obstructing relation to the front of the car so that the operator may gain access to the crank for effecting starting in case the necessity should arise, and also in order that access may be had to the radiator in case it is desirable to remove or repair the same.

Yet another object is the provision of a fender structure of this character in which the support is adjustable so that the fender proper may be disposed at different distances in advance of the front of the machine, this feature permitting the use of tires of a larger size than the usual equipment without danger of interference of the fender proper with the tires.

An additional object is the provision of a device of this character which will be comparatively simple and inexpensive in manufacture and installation, highly efficient and durable in service and a general improvement in the art.

With the above and other objects and advantages in view, the invention consists in the details of construction to be hereinafter more fully described and claimed and illustrated in the accompanying drawings in which—

Figure 1 is a side elevation showing my device in operative position.

Figure 2 is a similar view showing the fender in its elevated position.

Figure 3 is a front elevation.

Figure 4 is a side elevation with the fender proper swung upon one of its pivotal supports.

Figure 5 is a plan view with the fender swung to one side, the fender proper being shown in section.

Figure 6 is a fragmentary front elevation with the fender removed.

Figure 7 is a detail sectional view.

Referring more particularly to the drawings, the letter A designates the frame bars of the automobile, B represents the radiator, C the hood, and D the front wheels. In carrying out my invention I provide a pair of brackets 10 which are secured upon the frame bars A near the forward ends thereof and each of these brackets 10 includes spaced upstanding arms 11 through which extends a screw 12 provided with an adjusting nut 13 between the arms 11. At its forward end each screw 12 is formed with a head 14. Each head 14 is formed in its upper surface with a threaded socket 15 within which is screwed the lower end of a forwardly curved arm 16. The heads 14 have their forward ends forked, as shown at 17, and journaled through these forked ends is a horizontally disposed rock shaft 18 upon one end of which is secured a crank arm 19.

Secured upon the shaft 18 and located within the forks 17, are forwardly and downwardly extending arms 20 which terminate in bearing sleeves 21 through which is revoluble a bar 22 upon the ends of which are secured hinge members 23 which in actual practice may be T's, as shown. As a matter of fact the bar 22 might be formed solid, though in the present instance it is illustrated as being a length of pipe with the T's threaded upon the ends thereof. Secured to the bar 22 are the hub portions 24 of upwardly extending arms 25 with the upper ends of which are pivotally connected links 36 which are in turn pivotally connected with the forward ends of the bracket arms 16, as shown at 37. Formed upon the rear ends of the arms 20 are rearwardly extending lugs 35 which normally engage against the undersides of the heads 14 for limiting the downward movement of the fender proper and preventing it from dropping down and causing accident.

Associated with each of the T's 23 is a bracket 38 having a flat front face 39 from which extend headed studs 40. Each bracket further includes upper and lower spaced arms 41 disposed above and below the associated T and held in such association by the removable pivot pin 42 which passes through the arms 41 and through the T, and the purpose of the removability of these pins will be hereinafter made apparent.

The fender proper comprises a frame 43 of angle iron which has a forwardly curved lower portion which defines more or less of a platform 44 upon which a person may stand or upon which baggage or any other articles may be disposed in case such should be desired. This lower portion of the frame is covered with sheet-metal, indicated at 45, while the upper portion of the frame is covered with wire mesh, indicated at 46. The upper corners of this fender proper are cut away, as indicated at 47, so as to be in non-obstructing relation to the headlights indicated at E. The side bars of the frame 43 are formed with sets of keyhole slots 48 within selected pairs of which are engaged the headed studs 40 whereby to hold this fender proper in association with the brackets 38 carried by the bar 22.

It will be seen that by rocking the rock shaft 18 the fender proper may be moved up or down, as the case may be. In order to effect such movement, I provide a notched segment 49 secured upon one of the frame bars A and over which is movable a hand lever 50, pivoted at 51, and having a grip released locking pawl 52 engageable within a selected one of the notches 53 in the segment. Pivotally connected with this hand lever, as indicated at 54, is a forwardly extending rod 55 which has its forward end screwed into the adjusting sleeve 56 into which is also screwed a forwardly extending rod 57 which has its forward end pivotally connected, at 58, with the crank arm 19. It should be stated that the threaded ends of the rods 55 and 57 are oppositely threaded so that the sleeve 56 will act as a turn-buckle for shortening or lengthening the distance between the pivot points 54 and 58.

Assuming that the device has been constructed and assembled as above described, it is apparent that under ordinary conditions the parts will be arranged as shown in Figure 1, that is the fender proper will be in its lowered position approaching quite closely to the ground so that in case a pedestrian is struck he will not be run over.

When the fender is in this lowered position, the control lever will be in its forwardmost position and the relation of the parts will be maintained by the engagement of the locking pawl within the forwardmost one of the notches in the segment. It is to be noted that the throw of the lever and its control of the fender may be regulated by means of the turn-buckle sleeve structure.

In case the machine is traveling over very rough roads in which there are stones, stumps, or other obstructions which might strike against and break the fender, it is merely necessary that the operator grasp the control lever and pull it back whereupon the fender proper will be elevated into the position shown in Figure 2 so that injury will not result.

In case the machine is equipped with larger tires than originally intended, the heads 14 are moved partially by turning the nuts on the threaded portions of the rods so that the fender proper will be advanced to give sufficient clearance between the parts and the tires so as to avoid any possibility of interference. The turn buckle sleeve also permits the adjustment of the operating rod necessitated by the advancing of the fender proper.

In case it is necessary to gain access to the radiator for making repairs or for removing it and also to permit access to the crank, it is to be noted that by withdrawing either of the pivot pins which hold the fender proper to the T's 23, the fender may be swung to one side out of obstructing relation to the front of the vehicle, as indicated in Figure 5. By removing both of the pivot pins the fender proper may be bodily removed in case such should be found advantageous.

From the foregoing description and a study of the drawings it will be apparent that I have thus provided a simply constructed and consequently inexpensive fender which may be readily installed without necessitating the making of alterations in the structure of the chassis itself. It is likewise to be noted that owing to the simplicity of the construction and the fewness of the parts, that there is practically nothing to get out of order and that the device should have a long life and efficiently perform all the functions for which it is intended.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. A device of the character described comprising brackets secured upon the forward portions of the frame bars of an automobile, a rock shaft journaled through said brackets, arms carried by said rock shaft, lever operated means for rocking the rock shaft, a bar carried by the arms, and a fender proper detachably mounted upon said bar, the detachable mounting consisting T's mounted on the ends of said bar, rearwardly extending U-shaped brackets carried by the fender proper and straddling said T's, and removable pivot pins passing through said brackets and through said T's.

2. A device of the character described comprising brackets secured upon the forward portions of the frame bars of an automobile, a rock shaft journaled through said brackets, arms carried by said rock shaft, lever operated means for rocking the rock shaft, a bar carried by the arms, a fender proper detachably mounted upon said bar, and means whereby either end of the fender proper may be disengaged whereby the fender proper may be swung upon the other end.

3. A fender device of the character described comprising a pair of brackets secured upon the forward ends of the frame bars of an automobile, a rock shaft journaled through said brackets, lever operated means for rocking said shaft, arms carried by the rock shaft, a bar carried by the forward ends of said arms, hinge members carried by said bar at the ends thereof, a fender proper provided with hinge members cooperating with said first named hinge members, and pivot pins passing through the associated hinge members, both pins being removable to effect removal of the fender proper and either being removable whereby to permit swinging of the fender proper upon the other as a pivot.

4. A device of the character described comprising a pair of brackets secured upon the forward ends of the frame bars of an automobile, longitudinally adjustable members extending through said brackets, a rock shaft journaled through said members, means for rocking the shaft, arms on said rock shaft, a bar carried by said arms, and a fender proper detachably carried by said bar.

5. A fender device comprising a pair of brackets secured upon the forward portions of the frame bars of an automobile, threaded members adjustably mounted through said brackets and projecting forwardly therebeyond, said members terminating in heads, a rock shaft journaled through said heads, means for rocking said shaft, arms carried by the rock shaft, a fender proper carried by said arms, upwardly extending bracket arms adjustably connected with said heads, and links pivotally connected with said last named arms and having pivotal connection with the fender proper.

6. A device of the character described comprising a pair of brackets secured upon the forward portion of the frame bars of an automobile, longitudinally adjustable members carried by said brackets, arms extending parallel from said members, a bar carried by said arms, and a fender proper detachably connected with said bar, the connection of the fender proper with the bar consisting of T's mounted upon the ends of the bar, brackets carried by the fender proper and straddling said T's, and pins passing through said last named brackets and said T's, either pin being removable whereby to permit swinging of the fender proper to either side.

7. A fender device of the character described comprising a pair of brackets secured upon the forward portions of the frame bars of an automobile, a bar supported from said brackets, and a fender proper carried by said bar and capable of swinging movement to either side out of obstructing relation to the front of the vehicle, the mounting for the fender proper consisting in hinge elements carried by the bar, other hinge elements projecting from the rear side of the fender proper and straddling the first named hinge elements, and removable pivot pins passing through the associated hinge elements, both pivot pins being removable to permit removal of the entire fender proper.

8. A device of the character described comprising brackets secured upon the frame bars of an automobile, supporting members carried by said brackets, a rocker shaft journaled through said supporting members and carrying arms, a fender proper carried by said arms, means for rocking said rocker shaft, and rearwardly extending lugs formed on said arms and engaging beneath said supporting members for limiting downward swinging movement of the arms.

In testimony whereof I hereto affix my signature.

THOMAS F. BUCK.